US010478769B2

(12) United States Patent
Miclo et al.

(10) Patent No.: US 10,478,769 B2
(45) Date of Patent: Nov. 19, 2019

(54) DEPOLLUTION PRODUCT FOR TRAPPING VOLATILE ORGANIC COMPOUNDS, PARTICULARLY FORMALDEHYDE, AND METHOD FOR THE PRODUCTION THEREOF

(71) Applicant: INOVAME, Molsheim (FR)

(72) Inventors: Thierry Miclo, Hoenheim (FR); Nelly Piazzon, Soultz-les-Bains (FR); Frédéric Lanoux, Strasbourg (FR); Larisa Dobircau, Bergbieten (FR)

(73) Assignee: INOVAME, Molsheim (FR)

( * ) Notice: Subject to any disclaimer, the term of this patent is extended or adjusted under 35 U.S.C. 154(b) by 0 days.

(21) Appl. No.: 15/749,590

(22) PCT Filed: Aug. 3, 2016

(86) PCT No.: PCT/FR2016/052025
§ 371 (c)(1),
(2) Date: Feb. 1, 2018

(87) PCT Pub. No.: WO2017/021658
PCT Pub. Date: Feb. 9, 2017

(65) Prior Publication Data
US 2018/0221808 A1  Aug. 9, 2018

(30) Foreign Application Priority Data

Aug. 3, 2015 (FR) ..................... 15 57469
Mar. 18, 2016 (FR) ..................... 16 52317

(51) Int. Cl.
| B01J 20/22 | (2006.01) |
|---|---|
| B01D 53/04 | (2006.01) |
| B01J 20/20 | (2006.01) |
| B01D 53/72 | (2006.01) |

(Continued)

(52) U.S. Cl.
CPC ......... B01D 53/0407 (2013.01); B01D 53/72 (2013.01); B01J 20/20 (2013.01); B01J 20/22 (2013.01); B01J 20/2808 (2013.01); B01J 20/28064 (2013.01); B01J 20/28083 (2013.01); B01J 20/3078 (2013.01);
(Continued)

(58) Field of Classification Search
CPC .... B01D 53/0407; B01D 53/02; B01D 53/72; B01D 53/82; B01D 2253/102; B01D 2257/708; B01D 2259/4508; B01D 2258/06; B01J 20/2808; B01J 20/3078; B01J 20/28083; B01J 20/28064; B01J 20/22; B01J 20/2805; B01J 20/20; B01J 2220/46
USPC ......................................... 502/401
See application file for complete search history.

(56) References Cited

U.S. PATENT DOCUMENTS

| 2007/0021300 A1* | 1/2007 | Farant .................... B01J 20/20 502/430 |
| 2013/0052113 A1* | 2/2013 | Molins .................... B01D 53/04 423/245.1 |
| 2013/0157028 A1* | 6/2013 | Blanchard ............... B27N 7/005 428/219 |

* cited by examiner

*Primary Examiner* — Haytham Soliman
(74) *Attorney, Agent, or Firm* — Renner Kenner Greive Bobak Taylor and Weber

(57) ABSTRACT

The invention relates to a product that adsorbs VOCs (150), comprising acetoacetamide, said product being characterised in that it consists of granular activated carbon (100) coated with crystallised acetoacetamide (13) on the surface of the granules, leaving free the pores of the channels (10) of the spongy body formed by the granular activated carbon. The invention also relates to a method for producing such a product.

7 Claims, 2 Drawing Sheets

Figure 1:
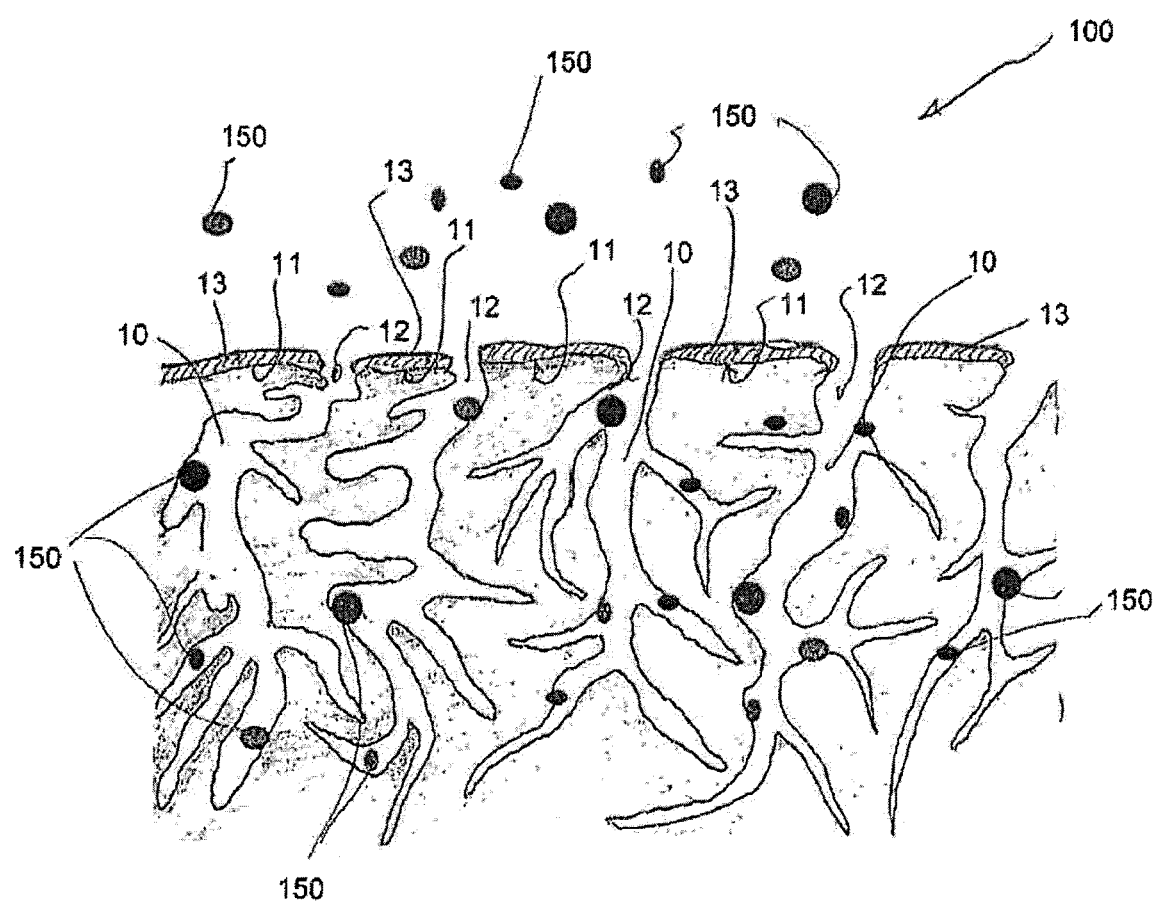

(51) Int. Cl.
*B01J 20/28* (2006.01)
*B01J 20/30* (2006.01)
(52) U.S. Cl.
CPC .. *B01D 2253/102* (2013.01); *B01D 2257/708* (2013.01); *B01D 2258/06* (2013.01); *B01J 2220/46* (2013.01)

DEPOLLUTION PRODUCT FOR TRAPPING VOLATILE ORGANIC COMPOUNDS, PARTICULARLY FORMALDEHYDE, AND METHOD FOR THE PRODUCTION THEREOF

FIELD OF THE INVENTION

This invention relates to a depollution product to eliminate certain volatile organic compounds and mainly formaldehyde as well as a process to obtain such a product.

STATE OF THE ART

There are different options to eliminate the emissions, for example those described in document EP 1 157 672 and involving the use of an absorbent structure in the form of a sheet for domestic applications like refrigerators, to absorb odours.

Nevertheless, this solution is not suitable to adsorb the volatile organic compounds (VOC). These volatile organic compounds and especially formaldehyde are emitted by furniture items.

These emissions also come from products of construction, interior fittings, or decoration, and are a problem and, in certain cases, a health hazard.

Thus, it is best to be able to trap these volatile organic compounds (VOC) as close as possible from their point of emission.

Also known (FR 2 946 265) is a mineral fibre mat containing an agent to trap the formaldehyde as well as its manufacturing process. The mineral fibre mat is mainly used in office or residential buildings as well as for vehicle equipment. The agent to trap the formaldehyde is selected among the active methylene compounds, hydrazines, tannins, amides, aminoacids and sulphites.

Also known (EP 1 414 432) is an inorganic fibre mat containing a phenolic resin and an agent to trap aldehydes, especially formaldehyde. This agent is a salt of sodium, potassium or calcium, sulphurous, dithionous or disulphurous acid.

According to the document US 2008/038971, it is known to produce a fibrous, insulating mat, particularly made of glass fibres bonded with a formophenolic resin. This mat has an agent for trapping the formaldehyde chosen from a long list of components which includes, in particular, urea and urea derivatives, bisulphite or metasulfites of an alkali metal or alkaline earth metal, acrylamide and methacrylamide as well as amino acids.

Also know in a different field (EP 905560) is a panel of natural or synthetic, non-mineral fibres, loaded with carbodihydrazide for trapping formaldehyde and acetaldehyde.

Also known according to the document EP 2 576 209, a mat of polymer fibres containing acetoacetamide in its broadest expression, the polymer being a polyolefin, a poly vinyl acetate, a polyvinyl alcohol, a poly lactic acid, an acrylonitrile, a polyester, a polyamide. This fibre mat is intended for buildings to trap formaldehyde. It replaces the previously known glass fibres with polyester fibres. It is therefore a mat structure, slightly different from previous structures while pursuing the same objective, that of binding the formaldehyde. However, polyester fibres, like the glass fibres, do not trap formaldehyde themselves.

PURPOSE OF THE INVENTION

The present invention aims to develop a simple product for effectively adsorbing volatile organic compounds and especially formaldehyde, released by furniture items such as construction, interior design or decoration products and which can be implemented in a simple and effective manner as well as a process for obtaining this product.

DESCRIPTION AND BENEFITS OF THE INVENTION

In this regard, the purpose of the invention is a product that adsorbs VOCs comprising acetoacetamide, characterised in that it consists of active carbon granules coated with acetoacetamide crystallised on the surface of the granules leaving free the pores of the channels of the cavernous body consisting of active carbon granules.

The product, according to the invention, has the advantage of effectively combining the action of active carbon to trap VOCs in the channels of the cavernous body of active carbon granules and that of acetoacetamide to bind the acetoacetamide.

The acetoacetamide crystallised on the surface of the granules leaves the pores free and does not penetrate the channels that retain all their effectiveness and their ability to trap the various VOCs.

Thus, a single product, an active carbon granule coated on the surface with crystallised acetoacetamide facilitates the creation of depollution fillers, for example contained in casings permeable to gases (air laden with pollutants) and packed hermetically in a package until used, to retain their full ability to trap VOCs.

This uniqueness of the product facilitates the trapping since all the depollution filler is uniformly exposed to the air to be cleaned.

This general rule accepts an exception in the case where the filler comprises on the one hand of a product as defined above (granules coated with crystallised acetoacetamide) and on the other hand, active carbon granules without coating, which makes it possible to determine the adsorption capacity and to bind the VOCs as per the more particular nature of the VOCs loading the air in a given volume, for example a furniture item.

According to another characteristic, the active carbon comprises active carbon granules with micropores of size less than 2 nm and mesoporous active carbon of size between 2 and 50 nm. The specific surface area of the active carbon is 300 to 3000 $m^2/g$ and in particular of the order of 1000 $m^2/g$.

The depollution product can be obtained from active carbon of the same category or from a mixture of different categories of active carbon according to the size of the pores (and the granule channels) and according to the specific surface.

For a precise determination of the depollution filler, it is preferable to start from products made separately with different categories of active carbon.

According to another characteristic, the acetoacetamide corresponds to the formula $C_4H_7O_2N$.

This form of acetoacetamide has the advantage of the simplicity of the compound which also has the highest efficiency for binding the formaldehyde.

The purpose of the invention is also a process for preparing a product filler adsorbing VOCs comprising active carbon and acetoacetamide, in particular for depollution sachets, this process being characterized in that the active carbon is prepared in the form of granules and acetoacetamide, the acetoacetamide is melted, the granules of active carbon are added when hot, to the acetoacetamide in the molten, liquid state, until all the acetoacetamide binds to the granules and then the mixture of active carbon granules coated with acetoacetamide is allowed to cool to recrystallise the acetoacetamide on the active carbon granules.

According to a characteristic of the process, the acetoacetamide is melted in a water bath at a temperature above its melting point but below its boiling point, the active carbon not added to the water bath is added, and is then returned to the water bath; it is then mixed until all of the liquid acetoacetamide binds to the active carbon granules, the mixture is removed from the water bath and allowed to cool for recrystallising.

Preferably, the active carbon is prepared in the form of granules by filtering to remove the dust and retain only the granules. This preparation is applied to active carbon, which will be combined with crystallised acetoacetamide, and also with active carbon added in addition to the filler. Thus, the active carbon dust will not agglutinate with acetoacetamide and, furthermore, it will not encumber the walls of the packaging bag for the uncoated active carbon, added to the active carbon dose treated as defined above.

As indicated, the purpose of the invention is also a filler made of depolluting material formed of active carbon granules coated with acetoacetamide in crystallised form resulting from the method defined above.

DRAWINGS

Figure 2:
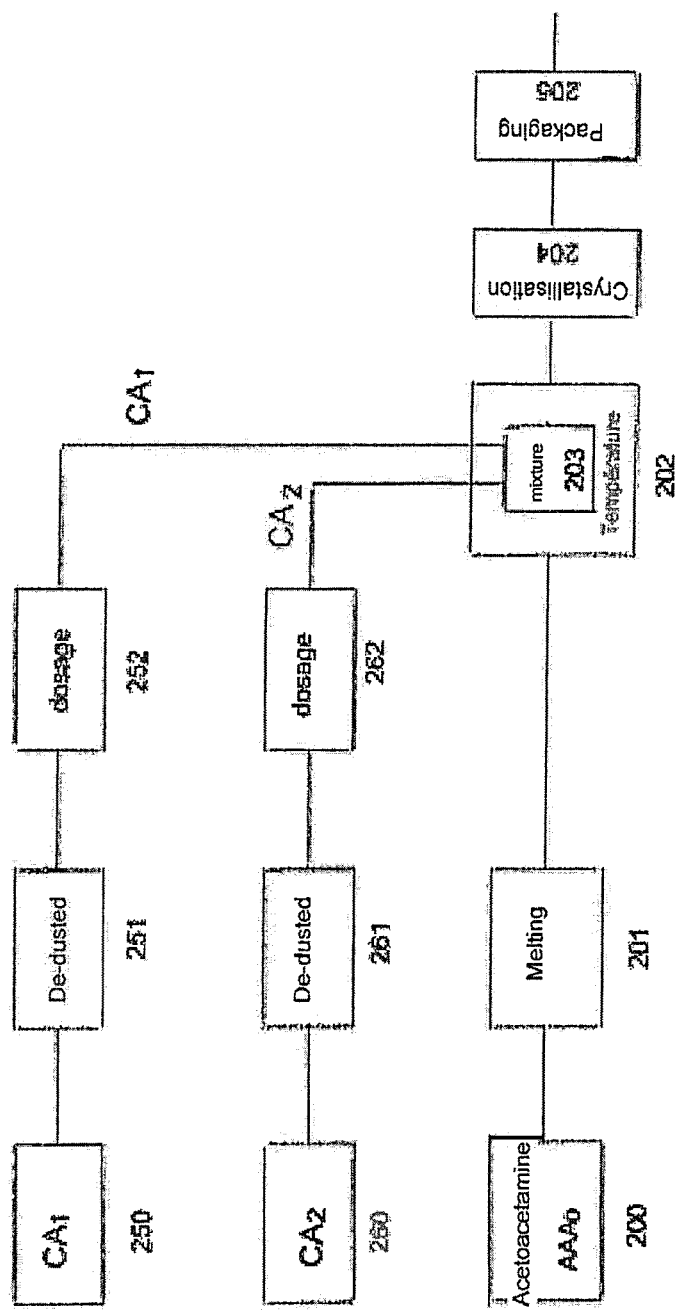

The present invention will be described hereinafter in more detail with the help of an example of a product and method, shown in the accompanying drawings in which:

FIG. 1 is a highly enlarged diagrammatic section of part of an active carbon granule according to the invention, FIG. 2 is a block diagram of the method for obtaining the depollution product according to the invention.

DESCRIPTION OF A FORM OF EMBODIMENT OF THE INVENTION

The purpose of the present invention is a pollution control compound for binding VOCs and especially formaldehyde released by objects, in particular furniture items and some building materials.

According to the invention, the product consists of particles or active carbon granules covered with crystallised acetoacetamide leaving the pores of the active carbon unobstructed.

The active carbon entering into this compound is dust-free active carbon, i.e. wherein small pieces of less than 100 nm in size and preferably active carbon powder, less than 180 nm in size have been removed.

The active carbon granules are preferably active carbon extruded in the form of small cylinders with a diameter of the order of 0.8 to 5 mm.

The active carbon granules are cavernous bodies having a sponge structure with a very large surface area of the order of 1000 $m^2/g$ or more. The channels open on the surface of the granules through pores. The cavernous structure and the size of the channels and pores depend on the raw material from which the active carbon is produced by calcination and by physical or chemical activation.

Dense woods or for example, coconut husks, produce active carbon with micropores smaller than 2 nm; less dense products such as white wood produce active carbon with mesopores of a size between 2 and 50 nm, and even macropores larger than 50 nm. There are also coal-based active carbons.

For a relatively polyvalent depollution product, it is advantageous to use granules having mesopores with a size of 2-50 nm and a specific surface area of 300 to 3,000 $m^2/g$ and in particular of 1,000 $m^2/g$ obtained from coal to preferentially trap benzene and toluene.

The active carbon is combined with a surface coating of crystallised acetoacetamide leaving the pores free.

FIG. 1 shows very schematically, and on a much enlarged scale, a section of a portion of an active carbon granule (100) highlighting the structure of its cavernous body with labyrinth channels (10) with multiple branches. The channels open on the outer surface (11) of the granule through pores (12). The outer surface (11) is covered with a layer (13) of crystallised acetoacetamide but leaving the specific surface free so that the VOCs can be adsorbed.

The crystallised acetoacetamide layer occupies the outer surface (11) of this cavernous structure.

FIG. 1 shows the VOC compounds (150) being emitted in the air. The compounds (150) are molecules of different sizes and which will be trapped in the channels (10), while the formaldehyde will bind to the layer (13) of crystallised acetoacetamide on the surface of the grain (100).

The formula of acetoacetamide is:

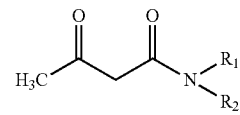

In this form, Ri and $R_2$ represent a hydrogen atom, a methyl radical or an ethyl radical.

Preferably, the simplest form of acetoacetamide is as follows: Ri=$R_2$=a hydrogen atom.

The process for preparing the compound according to the invention will be described hereinafter with reference to FIG. 2. The various steps of the method are shown in a block diagram referenced 200 . . . 262.

The method described is in batches of a certain quantity of acetoacetamide and active carbon. A continuous method is also possible.

Starting (200) from an acetoacetamide (AAAo), preferably in its simplest form, it is melted (201) and maintained (202) at a temperature above its melting temperature and lower than the boiling temperature. In the case of acetoacetamide with hydrogen radicals, the melting temperature is 56° C. and the boiling temperature is 140° C. Thus acetoacetamide (AAAo) is maintained at 80°.

In parallel or beforehand, the active carbon is prepared (250) and is de-dusted (251).

It is also possible to prepare and de-dust several CAi, $CA_2$ grades of CAi, $CA_2$ active carbon granules according to the pore size (260, 261), these various preparation operations being done beforehand or in parallel.

The active carbon is determined (252, 262) according to the batch to be acquired.

The dose of active carbon (CAi) ($CA_2$) is added (203) to the molten acetoacetamide (AAAo) and the temperature is maintained (202) above the melting temperature but below the boiling temperature, while the active carbon (CAi) and/or ($CA_2$) is poured into the tank and is mixed with the molten acetoacetamide.

The molten acetoacetamide then covers the active carbon particles. The acetoacetamide (AAAo) binds "as much as possible" to the free surface of active carbon granules, the amount of molten acetoacetamide being chosen to be preferably greater than necessary to cover the mass of active carbon granules.

After this application, the temperature is reduced so that the acetoacetamide crystallises (204). The remainder of unbound acetoacetamide crystallises on the walls of the tank. The coated granules and the freely crystallized acetoacetamide mass (205) are then separated and packed.

As indicated above, the dust is removed from the active carbon before it is placed in the acetoacetamide bath to prevent the acetoacetamide from clumping together and forming a thick clump, which could not cover the free surface of the active carbon granules.

As an example of preparation of a depollution filler with the active carbon-based product according to the process of the invention, a mixture of two to three mass units of active carbon and a mass unit of acetoacetamide is prepared. The acetoacetamide is melted at a temperature above its melting temperature which is of the order of 56° C. by heating preferably in a water bath at a temperature of about 80° C.

The active carbon in the form of granules is then added to the acetoacetamide in the liquid state, preferably by removing the container comprising the liquid acetoacetamide from the water bath. The container with the acetoacetamide and active carbon granules is again placed into the water bath and mixed to coat the active carbon granules with all the liquid acetoacetamide.

Once this mixture is prepared, the container is removed from the water bath and allowed to cool for recrystallisation of the acetoacetamide on the active carbon granules.

The operations described above can be carried out with greater or less amounts of the two components depending on the fillers of the depollution product to be manufactured.

The granules coated with crystallised acetoacetamide and an additional amount of active carbon granules are cold-mixed to form the filler which is introduced into the bag which is then hermetically sealed and dispensed.

The bag with its filler, once unpacked, is placed or kept near places that need to be cleaned. It ideally works in closed spaces of pre-determined volume. It may, for instance, be laid flat or held in a vertical position, for example by means of a fastening rod passed through the sheath formed by the folded flap or by being fixed using double-sided adhesive pads or used as a filter for an air purification unit.

EXAMPLE

For testing, three sachets each containing 39 g of active carbon and 16 g of active carbon loaded with surface-crystallised acetoacetamide obtained by melting 4 g of acetoacetamide and adding 12 g of active carbon are prepared.

The capacity of the three sachets (or depolluting modules) to reduce the concentration of volatile substances was evaluated by measuring the decrease in the concentration of three tracers (formaldehyde, toluene, n-dodecane) inside an emission test chamber containing the material.

The general test methodology follows the principles of ISO 16000-23:2009 (temperature of 23° C., relative humidity of 50%, air change rate of 0.5 h–1, load rate of 0.05 $m^2/m3$). In this test method, an emission test chamber containing the test material is supplied continuously with formaldehyde-laden air. The same principle was applied to toluene and n-dodecane.

The initial performance evaluation of the depolluting modules was conducted over a period of 14 days. A subsequent test of re-emission of the volatile substances by the modules was also carried out over 7 days following the initial performance test, by introducing clean air into the emission test chamber and checking the presence of volatile substances related to their possible desorption by the modules.

The performance of the three depolluting modules was determined by observing the difference between the vapour concentration of the volatile substance between the inlet and the outlet of the emission test chamber after 1, 3, 7 and 14 days of testing. For each sampling period, the following performance parameters were calculated:

- percentage (R) of reduction of the concentration of volatile substances in the emission test chamber in the presence of the modules, expressed as percentage (%),
- sorption flux by time and by area ($F_m$), expressed in micrograms of volatile substance per square meter of material and per hour ($\mu g/(m^2 \cdot h)$),
- equivalent ventilation flow rate ($F_{v,eq}$), expressed in cubic meters of air per square meter of material and per hour ($m3/(m^2 \cdot h)$), total surface mass of sorption ($\rho Ac$), expressed in micrograms of volatile substance per square meter of material$_5$ ($\mu g/m^2$).

The results of the tests are recorded in the table below:

| | Volatile substance | | | | | | | | | | | |
|---|---|---|---|---|---|---|---|---|---|---|---|---|
| | Formaldehyde | | | | Toluene | | | | n-Dodecane | | | |
| | Average concentration measured at the inlet of the emission test chamber | | | | | | | | | | | |
| | 103 ± 20 $\mu g/m^3$ | | | | 129 ± 10 $\mu g/m^3$ | | | | 8.9 ± 0.2 µg/m3 | | | |
| Sampling period | R | $F_m$ | Fv, eq | ρAc | R | $F_m$ | Fv, eq | ρAc | R | $F_m$ | Fv, eq | ρAc |
| Sampling at (24 ± 2) h | 44.9 | 440 | 8.1 | 10274 | 26.0 | 320 | 3.5 | 7466 | 27.3 | 24 | 3.8 | 660 |
| Sampling at (72 ± 6) h | 43.8 | 490 | 7.8 | 33608 | 28.5 | 350 | 4.0 | 24151 | 27.3 | 24 | 3.8 | 1704 |
| Sampling at (7 ± 1) days | 38.0 | 350 | 6.1 | 67394 | 30.1 | 370 | 4.3 | 59856 | 27.3 | 24 | 3.8 | 4020 |
| Sampling at (14 ± 1) days | 48.9 | 450 | 9.6 | 142648 | 35.6 | 470 | 5.5 | 138487 | 33.3 | 30 | 5.0 | 9039 |
| Average | 43.9 | 433 | 7.9 | | 30.1 | 378 | 4.3 | | 28.8 | 25.5 | 4.1 | |
| Standard deviation | 4.5 | 59.1 | 1.4 | | 4.1 | 65.0 | 0.9 | | 3.0 | 3.0 | 0.6 | |
| Coefficient of variation (%) | 10.3 | 13.6 | 17.7 | | 13.0 | 17.1 | 20.0 | | 10.4 | 11.8 | 14.6 | |

The 7-day re-emission test showed that the material used (the three depolluting modules) does not tend to release the three volatile substances retained as tracers (formaldehyde, toluene, n-dodecane).

The invention claimed is:

1. Product adsorbing VOC compounds comprising acetoacetamide, product characterised in that
   it comprises active carbon granules, each granule having a surface, pores, channels, and a cavernous body, wherein the granules are coated with acetoacetamide crystallised on the surface of the granules leaving free the pores of the channels of the cavernous body.

2. Product according to claim 1, characterised in that the active carbon comprises active carbon granules with micropores of size less than 2 nm and mesoporous active carbon of size between 2 and 50 nm and a specific surface area of 300 to 3000 $m^2/g$.

3. Method for the preparation of a product adsorbing VOC compounds, according to claim 1, characterised in that active carbon is prepared in the form of granules, the acetoacetamide is melted, the active carbon granules are added, to the liquid molten acetoacetamide and mixed to coat the granules with the acetoacetamide and then, the mixture of acetoacetamide-coated active carbon granules is allowed to cool to recrystallise the acetoacetamide on the active carbon granules.

4. Method according to claim 3, characterised in that the acetoacetamide is melted in a water bath at a temperature above its melting point but below its boiling point, the acetoacetamide is removed from the water bath before the active carbon is added, then the mixture of acetoacetamide and active carbon is put back into a water bath and mixed until all the liquid acetoacetamide coats the active carbon granules, the mixture is removed from the water bath and allowed to cool for recrystallisation.

5. Method according to claim 3, characterised in that the active carbon is prepared in the form of granules by dedusting.

6. Filler of depolluting material obtained according to the method of claim 3, characterised in that it comprises active carbon granules coated with crystallised acetoacetamide.

7. Filler of depolluting material according to claim 6, characterised in that it further comprises dedusted active carbon granules.

* * * * *